US008060453B2

(12) United States Patent
Tolmie, Jr. et al.

(10) Patent No.: US 8,060,453 B2
(45) Date of Patent: Nov. 15, 2011

(54) SYSTEM AND METHOD FOR FUNDS RECOVERY FROM AN INTEGRATED POSTAL SECURITY DEVICE

(75) Inventors: Robert J. Tolmie, Jr., Seymour, CT (US); Douglas A. Clark, Wallingford, CT (US); Mark A. Scribe, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 563 days.

(21) Appl. No.: 12/347,077

(22) Filed: Dec. 31, 2008

(65) Prior Publication Data

US 2010/0169240 A1 Jul. 1, 2010

(51) Int. Cl.
*G06Q 20/00* (2006.01)
*G06F 17/00* (2006.01)
*G07B 17/02* (2006.01)

(52) U.S. Cl. ............................ 705/401; 705/60; 705/62

(58) Field of Classification Search .................. 705/401, 705/60, 62
See application file for complete search history.

(56) References Cited

U.S. PATENT DOCUMENTS 4,253,158 A 2/1981 McFiggans
4,310,755 A 1/1982 Miller
4,376,299 A 3/1983 Rivest
4,649,266 A 3/1987 Eckert
4,908,502 A 3/1990 Jackson
5,111,030 A 5/1992 Brasington et al.
5,400,345 A 3/1995 Ryan, Jr.
5,715,431 A 2/1998 Everett et al.
5,731,980 A 3/1998 Dolan et al.
5,749,078 A 5/1998 Gargiulo et al.
5,774,399 A 6/1998 Kwon
5,793,867 A 8/1998 Cordery et al.
5,812,990 A 9/1998 Ryan, Jr. et al.
5,841,269 A 11/1998 Schoonmaker et al.
5,938,779 A 8/1999 Preston
5,963,928 A 10/1999 Lee
5,978,275 A 11/1999 Song et al.
5,999,921 A 12/1999 Arsenault et al.
6,000,774 A 12/1999 Nambudiri
6,050,486 A 4/2000 French et al.
6,061,670 A 5/2000 Brand
6,067,262 A 5/2000 Irrinki et al.
6,085,180 A 7/2000 Beer et al.
(Continued)

FOREIGN PATENT DOCUMENTS

EP 0302453 A1 8/1988
(Continued)

OTHER PUBLICATIONS

The European Search Report for European Patent Appplication No. 09015327.1.

(Continued)

*Primary Examiner* — John Hayes
*Assistant Examiner* — David J Clark
(74) *Attorney, Agent, or Firm* — George M. Macdonald; Charles R. Malandra, Jr.; Steven J. Shapiro

(57) ABSTRACT

Systems and methods for providing funds recovery for mailing machines including integrated circuits such as those used in postal security devices are described, and in certain configurations, systems and methods for recovering data such as postal funds records from a partially disabled single integrated circuit in a postal security device are described.

16 Claims, 5 Drawing Sheets

U.S. PATENT DOCUMENTS

| | | | | |
|---|---|---|---|---|
| 6,125,162 | A | 9/2000 | English et al. | |
| 6,141,654 | A | 10/2000 | Heiden et al. | |
| 6,144,950 | A | 11/2000 | Davies et al. | |
| 6,169,804 | B1 | 1/2001 | Ryan, Jr. et al. | |
| 6,175,826 | B1 | 1/2001 | Malandra, Jr. et al. | |
| 6,202,057 | B1 | 3/2001 | Pierce | |
| 6,260,144 | B1 | 7/2001 | Pitchenik et al. | |
| 6,295,359 | B1 | 9/2001 | Cordery et al. | |
| 6,397,328 | B1 | 5/2002 | Pitchenik et al. | |
| 6,585,433 | B2 | 7/2003 | Davies et al. | |
| 6,591,327 | B1 | 7/2003 | Briner et al. | |
| 6,592,027 | B2 | 7/2003 | Kovlakas | |
| 6,629,268 | B1 | 9/2003 | Arimilli et al. | |
| 6,839,695 | B2 | 1/2005 | Igval | |
| 6,868,407 | B1 | 3/2005 | Pierce | |
| 6,928,027 | B2 | 8/2005 | Li | |
| 7,143,068 | B2 | 11/2006 | Kissner et al. | |
| 7,194,443 | B1 | 3/2007 | Post et al. | |
| 7,233,930 | B1 | 6/2007 | Ryan, Jr. | |
| 7,247,791 | B2 | 7/2007 | Kulpa | |
| 7,272,581 | B2 | 9/2007 | Athens et al. | |
| 7,293,197 | B2 * | 11/2007 | Jadon et al. | 714/14 |
| 7,360,068 | B2 | 4/2008 | Borgatti et al. | |
| 2002/0029348 | A1 | 3/2002 | Du et al. | |
| 2005/0278499 | A1 | 12/2005 | Durham et al. | |
| 2006/0013044 | A1 | 1/2006 | Cheung | |
| 2007/0165457 | A1 | 7/2007 | Kim | |
| 2008/0122484 | A1 * | 5/2008 | Zhu et al. | 326/38 |
| 2008/0232174 | A1 | 9/2008 | Cornwell | |
| 2008/0253182 | A1 | 10/2008 | Kim et al. | |
| 2008/0298128 | A1 | 12/2008 | Kang et al. | |
| 2009/0287602 | A1 * | 11/2009 | Brunsmann | 705/40 |
| 2010/0165734 | A1 | 7/2010 | Moh et al. | |

FOREIGN PATENT DOCUMENTS

| | | | |
|---|---|---|---|
| EP | 0328062 | A2 | 8/1989 |
| EP | 0328062 | B1 | 4/1994 |
| WO | WO97/06599 | A1 | 2/1997 |

OTHER PUBLICATIONS

EPO Search Report in EP09015329.7-1229.

* cited by examiner

SYSTEM AND METHOD FOR FUNDS RECOVERY FROM AN INTEGRATED POSTAL SECURITY DEVICE

CROSS REFERENCE TO RELATED APPLICATIONS

This application is related to commonly-owned patent application Ser. No. 12/347,772, entitled "SYSTEM AND METHOD FOR DATA RECOVERY IN A DISABLED INTEGRATED CIRCUIT" and filed contemporaneously herewith by Sungwon Moh and Peter A. Pagliaro, which related application is incorporated herein by reference in its entirety.

FIELD OF THE INVENTION

The illustrative embodiments described in the present application relate generally to mailing machines including integrated circuits such as those used in postal security devices, and more particularly to systems and methods for recovering data such as postal funds records from a disabled integrated circuit in a postal security device.

BACKGROUND

Mailing machines for printing postage indicia on envelopes and other forms of mail pieces have enjoyed considerable commercial success. There are many different types of mailing machines, ranging from relatively small units that handle only one mail piece at a time, to large, multi-functional units that can process hundreds of mail pieces per hour in a continuous stream operation. Prior modern mailing machines that include postage meters store funds locally in an electronic postal security device (PSD). The postage fund credits are acquired through a postage purchase transaction known as a reset that is now typically electronically processed over a network connected to a data center. Such mailing machines including postage meters have utilized PSDs including multiple integrated circuit devices packaged in a physically secure housing. For example, the PSD typically includes cryptographic data including key data stored in memory that are required for operation of the PSD device. If a security breach was to be detected in the PSD physically secure housing, one tamper response would be to erase the cryptographic keys so that the device could not be used in a fraudulent or otherwise unauthorized fashion. The PSDs also include postal funds record data in registers including an ascending register and a descending register. The funds related data registers may also include one or more piece count bucket registers and a PSD and/or postage meter identification number. In a multiple integrated circuit module, a PSD processor integrated circuit might fail, but the separate memory device might remain functioning and continue to store the funds record data. In such a scenario, the funds record memory device could be removed from the PSD circuit board and read. In commonly-owned U.S. Pat. No. 4,421,977, issued on Dec. 20, 1983 to Kittredge, entitled Security System for Electronic Device," and incorporated herein by reference in its entirety, a secure housing is described for multiple circuit devices. Moreover, in a prior described PSD, an operating PSD was configured to visually output the funds register data in response to determining that the communications link to the postage metering device had failed. In that scenario, the PSD is operating normally, but the host postage meter has failed. Such a PSD is described in commonly-assigned U.S. Pat. No. 5,963,928 issued on Oct. 5, 1999 to Lee, entitled Secure Metering Vault Having LED Output for Recovery of Postal funds," and incorporated herein by reference in its entirety.

However, if the electronic components of a PSD were to be substantially implemented in a single integrated circuit device, portions of the device might independently fail. Accordingly, there is a need for a system that will allow secure recovery of postal security device data including funds register data from a partially failed integrated circuit postal security device.

SUMMARY

The present application describes illustrative embodiments of systems and methods for providing funds recovery for mailing machines including integrated circuits such as those used in postal security devices. In certain illustrative embodiments, the application more particularly describes systems and methods for recovering data such as postal funds records from a disabled integrated circuit in a postal security device.

In one illustrative configuration, a postal security device comprises logic contained primarily in a single integrated circuit such as an application specific integrated circuit having a processor, memory, associated logic and a non-volatile memory for storing postal funds record data. The application specific integrated circuit also includes a special purpose state machine configured to provide an emergency read-only mode for access to the non-volatile memory if another section of the circuit should fail. The state machine and non-volatile memory have a secondary power circuit and a secondary clock circuit used to provide access to the non-volatile memory. The write enable function of the non-volatile memory is disabled if an emergency read function is initiated.

In another illustrative configuration, the state machine enters the emergency read state by first erasing cryptographic keys in the postal security device in order to disable cryptographic processing in the device. Accordingly, the postal security device funds transactions functions are disabled if an emergency read function is performed on the postal funds record registers.

In yet another illustrative configuration, a second JTAG port or multiplexed JTAG port is used to provide read-only access to a section of non-volatile memory storing postal funds record data.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The illustrative embodiments of the present application describe systems and methods for providing funds recovery for mailing machines including integrated circuits such as those used in postal security devices, and more particularly to systems and methods for recovering data such as postal funds records from a disabled integrated circuit in a postal security device.

In traditional postal security devices (PSDs) that utilize multiple integrated circuits and individual memory circuit in a PSD module, the processor, power distribution, clock or other subsystem of the module may fail. In such a scenario, the memory device storing the postal funds data records may be removed from a dismantled PSD and read in order to retrieve the data. Additionally, since interconnection nodes are available, faulty components could be bypassed and other signal control utilized to read the relevant memory devices. The illustrative embodiments herein describe a highly integrated PSD such as one having many of its traditional processing elements housed in a single Application Specific Integrated Circuit (ASIC). The embodiments provide for a secondary access subsystem to allow independent access to the postal funds data records using additional gates designed into the ASIC to allow access to the small number of bytes of memory that comprise the postal funds records such as the ascending register, descending register, piece count and meter identification number. The illustrative embodiments described herein relate to postage value transactions, but the teachings of the embodiments described may be applied to other value metering devices.

In the case of a highly integrated PSD such as a PSD on a single chip, a PSD substantially on a single integrated circuit or a PSD using a processor with embedded non-volatile memory (NVM) for storing postal funds records, access to the relevant NVM would be controlled by circuitry resident in the single integrated circuit. Accordingly, access to the postal data records may not be possible if the integrated ASIC fails in such a way as to prevent normal memory access such as through a processor read of the memory device. Moreover, a highly integrated ASIC with multiple functions is more complex and includes more functionality and logic gates. Accordingly, such an ASIC is more likely to fail due to a problem with an unrelated part of the ASIC than would be likely with a multi-chip module. It has been found that a relatively small number of logic gates may be added to such an ASIC to greatly enhance the likelihood that relevant data might be retrieved from a partially failed ASIC using the systems and methods described herein.

Figure 1:
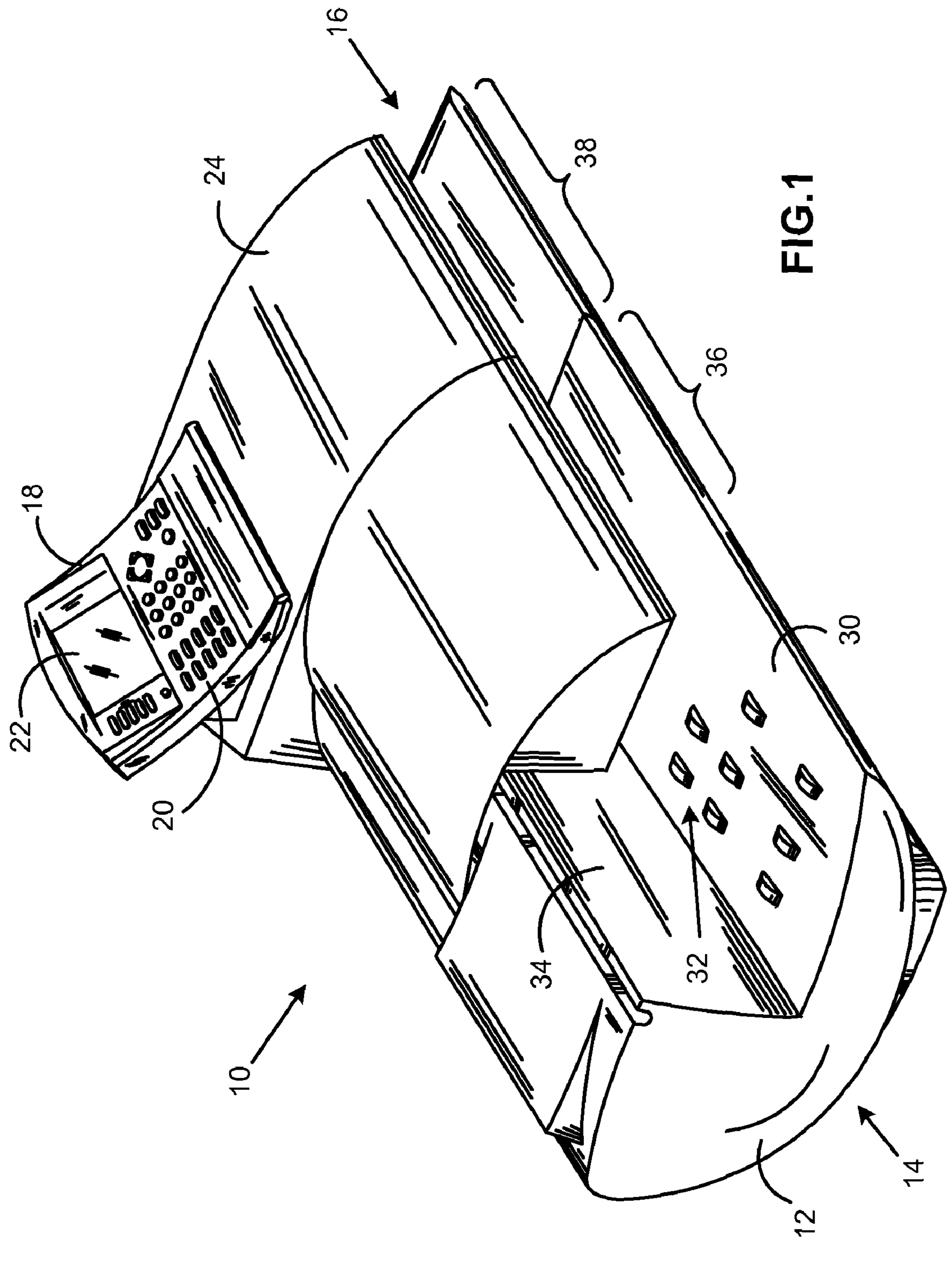
FIG. 1 is a schematic diagram of a mailing machine including an integrated circuit postal security device according to an illustrative embodiment of the present application.

Referring to FIG. 1, a schematic diagram of a mailing machine 10 including an integrated circuit postal security device according to an illustrative embodiment of the present application is shown. The mailing machine 10 comprises a base unit, designated generally by the reference numeral 12, the base unit 12 includes a mail piece input end, designated generally by the reference numeral 14 and a mail piece output end, designated generally by the reference numeral 16. One or more cover members 24 are pivotally mounted on the base 12 so as to move from the closed position shown in FIG. 1 to an open position (not shown) so as to expose various operating components and parts for service and/or repair as needed. The base unit 12 further includes a horizontal feed deck 30, 36, 38 which extends substantially from the input end 14 to the output end 16. A plurality of nudger rollers 32 are suitably mounted under the feed deck 30 and project upwardly through openings in the feed deck so that the periphery of the rollers 32 is slightly above the upper surface of the feed deck 30 and can exert a forward feeding force on a succession of mail pieces placed in the input end 14. A vertical wall 34 defines a mail piece stacking location from which the mail pieces are fed by the nudger rollers 32 along the feed deck 30 and into a transport subsystem that transports the media such as envelopes to be franked to the inkjet printing subsystem (not shown) that is generally located under cover 24.

A control unit 18 (user interface controller, UIC) is mounted on the base unit 12, and includes one or more input/output devices, such as, for example, a keyboard 20 and a display device 22. The control unit includes a main processor (not shown) and a postal security device (PSD) (not shown). In this illustrative example, mailing machine 10 comprises a modified version of the DM 500 mailing machine available from Pitney Bowes Inc. of Stamford Conn., wherein the mailing machine 10 is modified to include an integrated circuit postal security device as described herein. The postal security device is a secure value vault configured to store postage funds.

Figure 2:
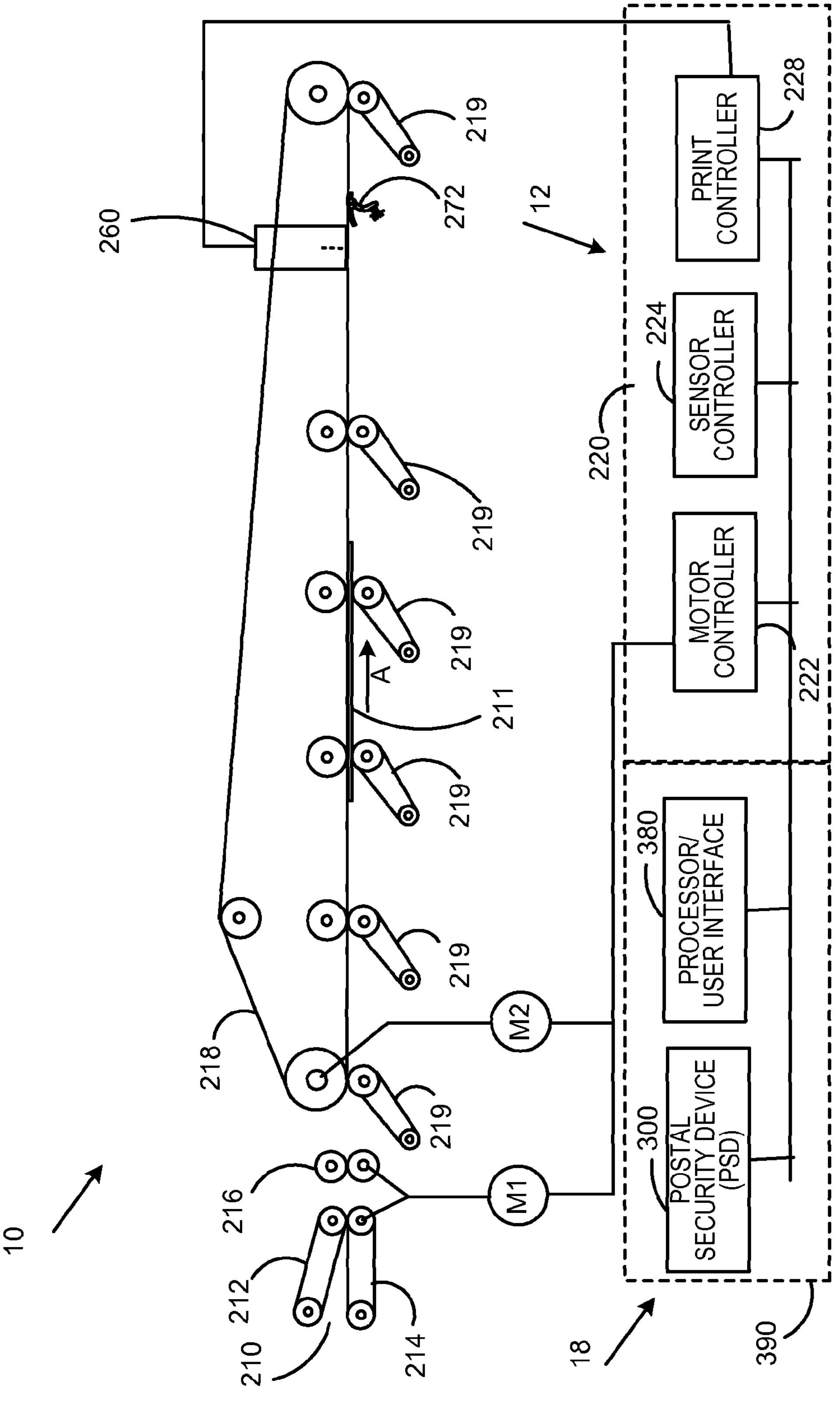
FIG. 2 is a partial schematic diagram of the mailing machine of FIG. 1 including a user interface controller including a postal security device and a printer subsystem including controller and media transport.

Referring to FIG. 2, a partial schematic diagram of the mailing machine 10 of FIG. 1 including a user interface controller 18 including a postal security device 300 and a printer subsystem including controller and media transport is shown. The controller and transport subsystem configuration is illustrative and other suitable subsystem configurations may be substituted as appropriate. The mailing machine 10 includes an integrated ASIC based postal security device 300 as described more fully herein.

The conveyor subsystem includes a singulator module 210 that receives a stack of media such as a stack of envelopes (not shown) including envelope 211, or other mail pieces such as postcards, folders and the like, and separates and feeds them serially in a path of travel as indicated by arrow A. The conveyor subsystem feeds the envelopes 211 in the path of travel A along a deck past the printer subsystem so that a postal indicia or other marking can be printed on each envelope 211. Together, the singulator module 210 and the conveyor module make up a transport subsystem for feeding the media in mailing machine 10. The singulator module 210 includes a feeder assembly 214 and a retard assembly 212 which work cooperatively to separate a stack of envelopes (not shown) and feed them one at a time to a pair of take-away rollers 216. The feeder assembly 214 and take-away rollers are driven by motor M1 using any suitable drive train (not shown).

The conveyor subsystem includes an endless belt subsystem 218 including a belt and pulleys (including a drive pulley driven by motor M2) mounted to any suitable structure (not shown) such as a frame. The drive pulley is operatively connected to motor M2 by any conventional means such as intermeshing gears (not shown) or a timing belt (not shown) and controlled by motor controller 222 in order to advance the envelope 211 along the path of travel A. The conveyor subsystem also includes a plurality of idler pulleys with normal rollers 219. The normal force rollers 219 work to bias the envelope 211 up against the deck including a top registration plate in a system known as top surface registration. In the area of the print subsystem, the registration plate has appropriate opening and media "ski" 272 near the print head 260 used to top register the mail piece. The print head 260 is used to print cryptographically secure postal indicia that provide evidence of postage payment dispensed by postal security device 300.

The main controller subsystem 220 includes motor controller 222, sensor controller 224, and the print controller 228 along with associated memory and peripheral components (not shown) mounted on circuit boards in the mailing machine 10 chassis. The sensor controller 224 preferably controls media location detectors such as optical position detectors and other mailing machine sensors (not shown). The user interface controller 18 may be removable from the mailing machine 10 and includes a circuit assembly 390 with a main processor/user interface controller 380 and a physically secure postal security device module 300. Other modules of the mailing machine 10 have not been shown for the sake of clarity. Processor/user interface 380 includes a communications subsystem (not shown) for connection to a remote data center such as by modem dial-up connection or through an ETHERNET network to connect remotely through a network such as the INTERNET.

Many mailing machines including a postage meter are configured to allow remote reset or addition of funds such as by connecting to a remote data center for postage funds purchase transactions. For example, commonly-owned U.S. Pat. No. 4,376,299 issued Mar. 8, 1983 to Rivest and U.S. Pat. No. 4,787,045 issued Nov. 22, 1988 to Storace, et al. described data centers for remote postage meter recharging. Systems describing secure PSDs are shown in commonly-owned U.S. Pat. No. 4,813,912, issued Mar. 21, 1989 to Chickneas, et al. and U.S. Pat. No. 5,812,990 issued Sep. 22, 1998 to Ryan, Jr., et al. A system for using multiple PSDs is shown in commonly-owned U.S. Pat. No. 5,731,980, issued Mar. 24, 1998 to Dolan, et al. PSD register processing is described in commonly-owed U.S. Pat. No. 7,272,581 B2 issued Sep. 18, 2007 to Athens, et al., entitled Method and System for Optimizing Throughput of Mailing Machine. Additional systems are described in U.S. Pat. No. 6,131,090, issued Oct. 10, 2000 to Basso, Jr., et al. and U.S. Pat. No. 5,526,741, issued Jun. 18, 1996 to Gallagher, et al. Each of the above noted patents are incorporated herein by reference in their entirety.

Figure 3:
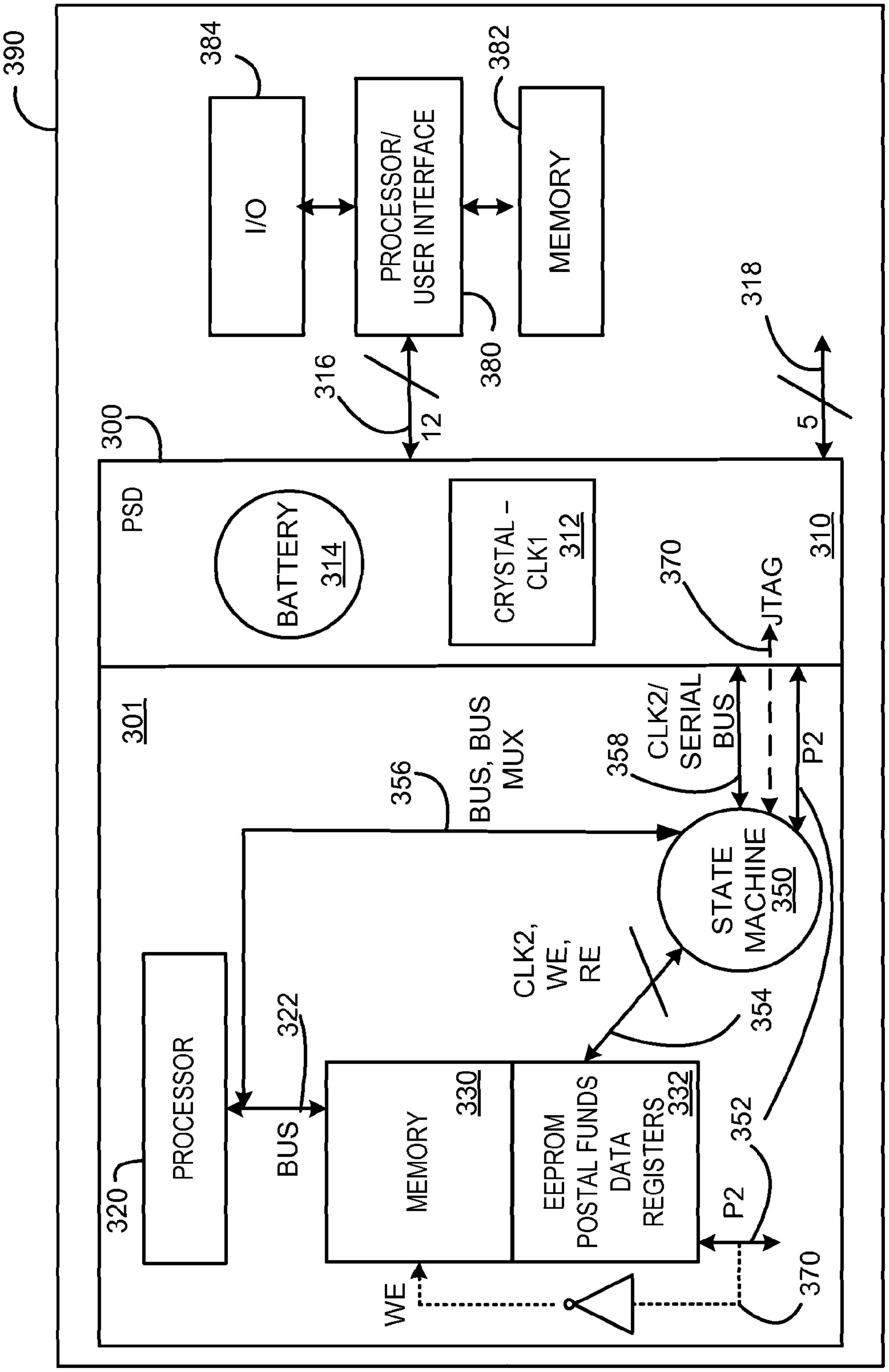
FIG. 3 is a schematic diagram of a user interface controller and a connected postal security device according to an illustrative embodiment of the present application.

Referring to FIG. 3, a schematic diagram of a user interface controller circuit 390 and a connected postal security device 300 according to an illustrative embodiment of the present application is shown. If a PSD having a single integrated circuit ASIC fails, it is possible that the postal security funds record locations will not be accessible though the normal data channel. Providing a second memory read channel for an emergency read procedure greatly increases the likelihood that postal funds record data may be retrieved from a partially disabled ASIC. Removing the ASIC "die" from its package in order to probe internal pads or gates would be extremely difficult and costly as compared to access through a properly configured second channel.

The postal funds data records are also known as Funds Relevant Data Items (FRDIs) and are typically stored in NVM memory in a PSD. Because a single, monolithic ASIC PSD is utilized here, the memory is difficult to access in a partial failure mode. In a multi-chip PSD module, a discrete memory device could be removed and individually powered and controlled in order to read postal funds data records after a PSD failure. A partial failure of the ASIC may involve the processor 320 or support circuitry and therefore, normal access to the memory storing FRDIs would not be possible. The NVM storing FRDIs is implemented as a parallel EEPROM, but has a virtual second read only port provided by the state machine 350 and multiplexing bus access to provide read only access to the relevant registers.

A PSD typically includes Security Relevant Data Items (SRDIs) such as PKI and secret key system cryptographic keys. In the process described herein, when the emergency read process is used, the SRDIs are erased. The emergency read process preferably sequentially reads the FRDIs in a read only mode with write access to the relevant NVM disabled.

The user interface controller device 18 is removable from the base 12 of mailing machine 10. Located inside the user interface controller 18 is the user interface controller circuit board 390 that includes the user interface main processor 380 and peripheral devices such as I/O 384 and memory 382. The I/O subsystem 384 includes interconnection circuits to communicate with the electronics 220 of the mailing machine base 12, the PSD 300, and networks such as a modem subsystem, ETHERNET subsystem and/or WI-FI subsystem to provide access to remote systems such as data centers through private networks or public networks such as the INTERNET. The main processor memory 382 includes a memory map that includes multiple types of memory devices and multiple integrated circuits with association bus and signal control circuitry to provide SRAM, Dynamic RAM (DRAM) and/or NVM including EEPROM, Flash or BSRAM devices.

The PSD 300 is connected to the processor/user interface electronics through a 12 finger card edge connector 316. Alternatively, other connection ports may be used. The PSD 300 is preferably a FIPS 104-2, level 3 rated physically secure device. The PSD 300 is enclosed and includes a circuit board 310 having a crystal 312, a battery 314 and other related support components (not shown). PSD ASIC 301 is mounted on circuit board 310 and is preferably physically secure. The circuit board 310 also includes an emergency read port 318 that includes the required backup power 352, clock and/or data lines 358 needed to perform the emergency read procedures described herein. Alternatively, some of the relevant emergency read signals such as data bus lines may reside on port 316 or on another port. Optionally, one or more JTAG ports 370 are provided.

The PSD ASIC 301 includes an embedded processor core 320 such as an ARM7 processor core. The memory map of the device includes multiple memory types such as SRAM, DRAM, and NVM such as EEPROM, Flash and/or BSRAM. The PSD 300 includes relevant support circuitry such as power conditioning and distribution, clock dividers and drivers, test access, main bus control and other relevant devices (not shown). The memory bus 322 is representative and allows multiple access to at least relevant portions of the address and data busses required such as through a second bus and bus arbitrator along line 356 from the bus circuitry of state machine 350.

The PSD memory 330, 332 is not to scale. PSD memory 330 includes the main program memory, working memory, status registers and data storage. PSD are used to store funds using known register types including an ascending register that counts up all of the funds ever processed by the PSD and a descending register that counts down as the current funds are dispensed through postage indicia printing transactions are processed. Similarly, a piece count tracks the number of indicia printed. PSD memory 332 is a region of NVM memory that contains the postal funds data registers for storing data including the ascending register, the descending register, the piece count and the meter identification code. Memory 332 is an actual or virtual dual port memory. In the virtual dual port configuration described, bus arbitration and the state machine 350 provide for a second partial read only port into the memory. The funds related data registers may also include one or more piece count bucket registers and a PSD and/or postage meter identification number. In alternative configurations, detailed data regarding each transaction may also be stored in addition to the piece count data.

Here, the ASIC has a separate power plane P2 that has separate power and ground pins on the emergency port 318. This power plane P2 powers only the required EEPROM, bus and state machine gates required to perform the emergency read functions described herein. In this embodiment, only P2 powers the state machine components that are not needed to be powered to avoid interfering with normal operation of the ASIC. However, the main power could alternatively power the whole device and P2 may be injected as a backup power source for the limited gates and devices needed to accomplish the emergency read function. The ASIC includes circuitry to prevent back-powering of circuitry other than the EEPROM section and its associated state machine circuitry.

The emergency read port 318 provides certain of the emergency read signals to PSD 301 through a header. Here, state machine 350 has backup power P2, backup clock CLK2 and a serial bus connected. It provides control write enable WE, read enable and clock CLK2 to the memory over 354. The WE line in 354 is used to disable write functions in the memory. Optionally, the ASIC 301 is configured to have an automatic write enable disable feature 370 whereby presence of emergency read backup power supply P2 352 drives a gate to disable the write enable on at least the section of memory that holds the postal funds data records. Instead of a state machine 350, the PSD 300 may alternatively use a small programmed general purpose processor such as an 8 bit 8051 compatible core or other secondary memory access channel device.

Figure 4:
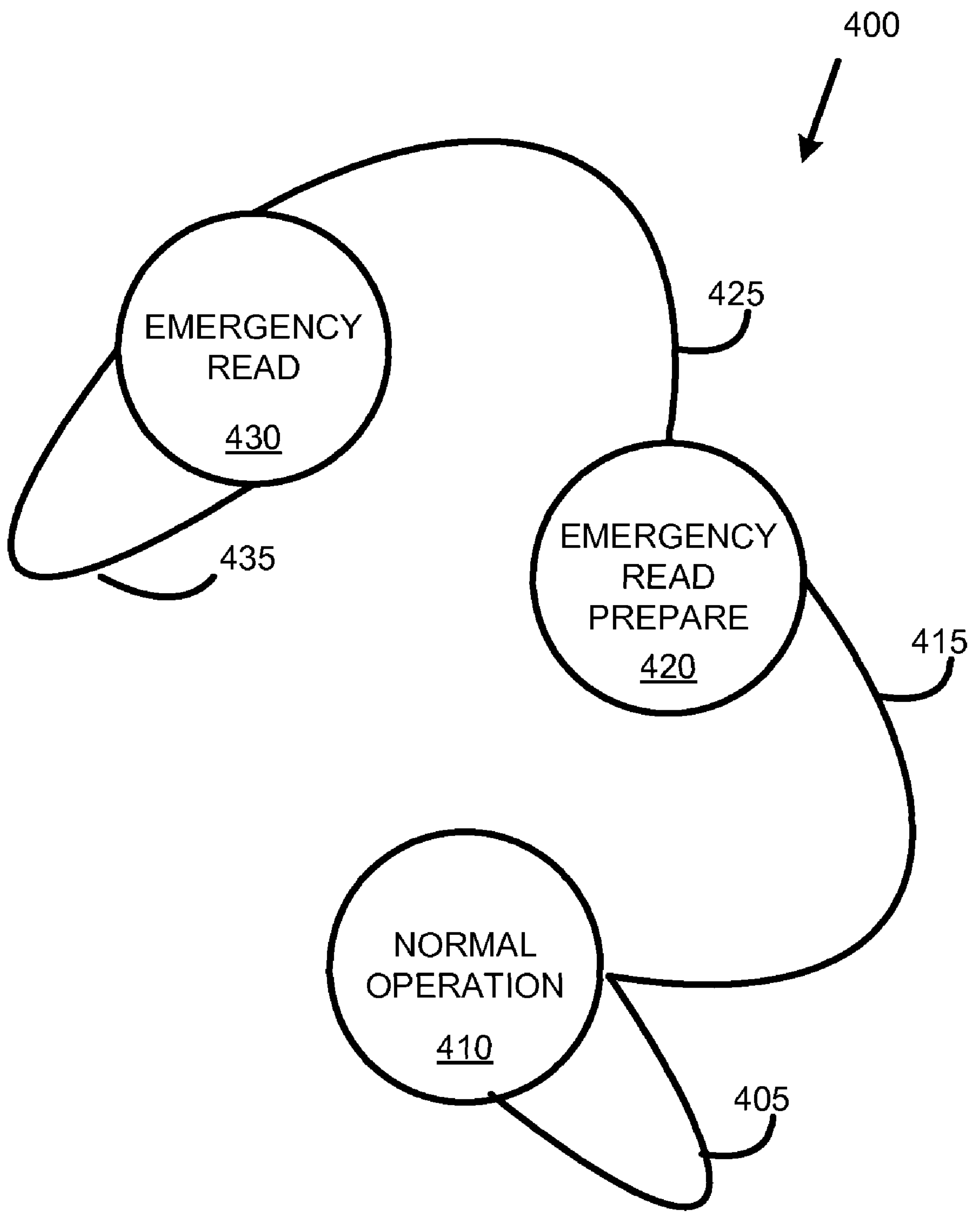
FIG. 4 is a schematic diagram of a state machine of the postal security device of FIG. 3.

Referring to FIG. 4, a schematic diagram 400 of a state machine 350 of the postal security device 300 of FIG. 3 is shown. The emergency read state machine 350 depicted in diagram 400 comprises a relatively small number of gates of ASIC 301 and powers up in state 410. In state 410, the PSD 300 is operating normally and the state machine 350 does nothing except stay in its home state on path 405. When an emergency read initiation state change 415 occurs, such as by sensing presence of P2 or other control signal on the emergency read port 358 or even a control signal on card finger port 316, the state machine transitions on path 415 to state 420. In state 420, the state machine processes its pre-read protocol that includes at least disabling of the write capability of the memory registers to be read. Additional optional steps include holding the reset pin of the embedded CPU processor 320, holding down the main clock signal 312 if appropriate in the particular design and erasing secure locations such as cryptographic key storage registers.

Once the state machine completes the pre-read tasks of state 420, the state machine follows path 425 to state 430. In state 430, the state machine performs the emergency read. Here, the necessary bus control is asserted to control the memory bus and the postal funds record registers are read and serially output over the I2C serial port provided for emergency read functions. For example, the state machine includes at least the start address of the register range and can serially increment the address to process the known range of postal funds data registers. The state machine provides the bus control and address information required to read the relevant registers. The state machine optionally includes a buffer to hold the relevant register data while it is serially outputting that data on the I2C channel. Optionally, the postal funds record registers are actual dual port devices and the state machine controls the second read only port to process the emergency read request. The state machine then terminates by staying in state 430 on path 435. Optionally, state 430 continuously outputs the register data until power P2 is removed.

Figure 5:
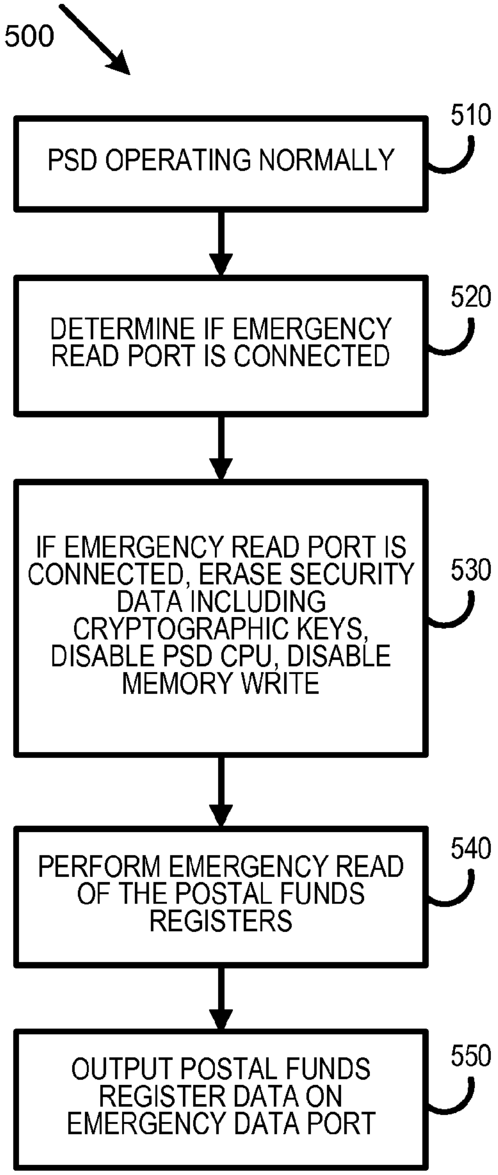
FIG. 5 is a flow chart describing a process for reading postal security record registers in a partially disabled integrated postal security device according to an illustrative embodiment of the present application.

Referring to FIG. 5, a flow chart describing a process 500 for reading postal security record registers in a partially disabled integrated postal security device according to an illustrative embodiment of the present application is shown. In step 510, the process starts with a normally operating PSD. At some time, portions of the PSD ASIC may fail such that the postal funds record data is not accessible through the normal USB communications channel of the device. Accordingly, the device may have an emergency read port connected such as through a ribbon cable connection from a test fixture to an emergency read header on the PSD circuit card 310. In step 520, the process determines if the emergency read port cable is connected such as by sensing the presence of power on pin P2 or the other signals on the emergency read port.

In step 530, if the emergency read port is connected, the process performs any pre-emergency read requirements such as erasing any security data including any cryptographic keys, disabling the main PSD CPU core and disabling the memory write capability for at least the memory locations that are to be read. In step 540, the process performs the emergency read of the postal funds registers. In step 550, the process outputs the postal funds register data and may output the data on a serial or parallel bus. In the illustrative embodiments, a standard I2C serial port is used by the emergency read state machine to output the register contents.

Figure 6:
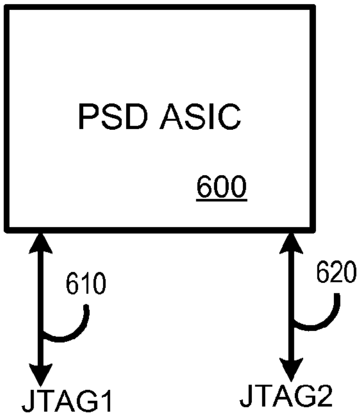
FIG. 6 is a schematic diagram of a postal security device according to an illustrative embodiment of the present application.

Referring to FIG. 6, a schematic diagram of a postal security device 600 according to an illustrative embodiment of the present application is shown. In another alternative embodiment applicable to any of the relevant embodiments herein, the ASIC includes an IEEE standard JTAG subsystem. In one embodiment, the ASIC includes a standard JTAG testing subsystem 610 with JTAG state machine and appropriate pins and registers. In yet an alternative applicable to any of the relevant embodiments herein, the ASIC includes two JTAG ports. The first JTAG port 610 is used to test the processor and the other circuitry of the processor. Because the illustrative embodiment is a single logic integrated circuit solution, the JTAG port is not connected in serial or parallel to other JTAG enabled integrated circuits under test. The first JTAG port is then disabled after the manufacturing test process applied to the ASIC. The second JTAG port 620 is connected to access the postal funds records EEPROM register locations with a specific JTAG test program designed to read only the postal funds records locations out on the second JTAG channel. The state machine therefore provides a second memory port into the EEPROM that provides for a serial output of the memory registers in serial fashion over the JTAG2 serial bus. As above, when accessing the second JTAG port 620, the JTAG test program is designed to erase security data such as the stored cryptographic keys as a security precaution. Unlike the first JTAG port, the second JTAG port 620 is clocked by CLK2.

When system power is removed from a device using typical random access memory (RAM), the data stored in the RAM is lost. There are several types of non-volatile memory (NVM) available that maintain the stored data after system power is removed including battery-backed RAM, Traditional small block or byte writable Electrically Erasable Programmable Read Only Memory (EEPROM) is distinguished from the more modern FLASH NVM. Dual port memory however, has typically been used in video display applications such as in dual port Video Ram (VRAM). In an alternative applicable to any of the relevant embodiments herein, the EEPROM memory comprises dual port NVM memory such as dual port EEPROM memory having a primary channel through the system bus and then a secondary read-only channel accessible through the state machine 350 using a second bus.

The processes described herein are programmed in the appropriate assembler language for the CPU processor used such as the RENASAS SH series processors or the INTEL ATOM processors. Alternatively, the C or C++ programming language or other appropriate higher level language may be utilized to create the programs resident in memory 382. The computing subsystem 390 comprises a single board computer such as a RENESAS SH series single board computer or an INTEL ATOM x86 single board computer with a USB interface to the PSD 300 using 12 finger card edge connector 316. The emergency read channel includes an I2C serial port with clock and data pins optionally on the 12 finger card edge connector 316 or on a header used for the invasive emergency read process. The ASIC processor 320 includes an embedded processor IP core such as the commonly used ARM7 core. The processors run on real-time or other operating systems such as QNX, embedded LINUX or WINDOWS CE stored in memory 330, 382. In another alternative embodiment applicable to any of the relevant embodiments herein, instead of an ASIC, any other programmable or otherwise customizable integrated circuit such as Field-programmable gate array (FPGA) may be used. Embedded memory 330, 332 includes a combination of Static RAM (SRAM), EEPROM and Battery-backed SRAM (BSRAM).

In yet another alternative embodiment applicable to any of the relevant embodiments herein, the state machine is always powered such as by being connected to P1 or by P2 being normally supplied. The EEPROM memory 332 is dual port with a second read only port. The state machine includes a normal operation state that acts to create a separate redundant copy of the postal funds data registers in another EEPROM memory location that is not addressable by CPU processor 320. Here the secondary memory location utilizes a memory bus to connect to the state machine in parallel. However, a serial bus could be utilized if the speed were sufficient. Since the state machine is in essence a parallel processor, the redundant read/write will not impact system performance. In this alternative, the state machine then provides an output of the backup registers, the primary registers or both during an emergency read function. In a further alternative, the state machine includes a secondary cryptographic engine that uses a relatively small cryptographic key to digitally sign the combination of the PSD ID, the ascending register and the descending register in order to securely store the emergency copy of the postal funds registers.

In yet another alternative applicable to any of the relevant embodiments herein, P2 comprises a voltage level that is lower than the primary power voltage level such as ½ core voltage, but sufficient to power the NVM and state machine in a read only process. Similarly, the clocking circuit to the NVM 332 may be multiplexed such that the presence of P2 selects CLK2 for the memory device 332. Accordingly, as another security measure, CLK2 may alternatively be slower than CLK1 such as ½ speed but sufficient to clock EEPROM 332 and state machine 350 in a read only mode. The ASIC core may typically run at anywhere from 10-300 Mhz as appropriate and at 1.8 V with 3.3 v and 5 v power available for other circuits.

As described with regard to the illustrative embodiments herein, the PSD 300 comprises a primary single integrated circuit ASIC 301 including at least most of the logic functionality of the PSD. Ancillary circuits including minor integrated circuits may also be included on circuit board 310 in PSD 300. Mail pieces as used herein may include a wide range of material such as postcards, letters, envelopes, flats and postal tape for application to a parcel.

Commonly-owned patent application Ser. No. 12/347,772, entitled "SYSTEM AND METHOD FOR DATA RECOVERY IN A DISABLED INTEGRATED CIRCUIT" and filed contemporaneously herewith by Sungwon Moh and Peter A. Pagliaro is incorporated herein by reference in its entirety. Any of the embodiments therein or portions thereof may be combined with the embodiments herein as would be known by one of skill in the art practicing the teachings herein.

A number of embodiments of the present invention and relevant alternatives have been described. Nevertheless, it will be understood that various modifications may be made without departing from the spirit and scope of the invention. Other variations relating to implementation of the functions described herein can also be implemented. Accordingly, other embodiments are within the scope of the following claims.

We claim:

1. A mailing machine for printing evidence of postage payment on mail pieces comprising:

a printer subsystem for printing indicia on a mail pieces;

a first processor operatively connected to the printer subsystem; and a postal security device operatively connected to the first processor, the postal security device comprising a primary single integrated circuit including:

a postal security device processor used to process requests for the evidence of postage payment;

a plurality of non-volatile memory registers operatively connected to the postal security device processor for storing postal funds record data; and a primary bus and control circuit operatively connecting the postal security device processor to the non-volatile memory registers for read and write access;

a secondary memory access device operatively connected to the non-volatile memory registers to provide read only access to the plurality of non-volatile memory registers, wherein, the secondary memory access device erases a secure memory location before providing read only access to the plurality of non-volatile memory registers.

2. The mailing machine according to claim 1, wherein, the secondary memory access device comprises a state machine and bus multiplexor and a write disable circuit.

3. The mailing machine according to claim 1, wherein the postal security device further comprises:

a first power circuit for powering the postal security device processor, the plurality of non-volatile memory registers, and the primary bus and control circuit;

a second power circuit for providing emergency power and powering the secondary memory access device and alternatively powering the plurality of non-volatile memory registers.

4. The mailing machine according to claim 2, wherein the postal security device further comprises:

a first clock circuit for providing clock signals to the postal security device processor, the plurality of non-volatile memory registers, and the primary bus and control circuit;

a second clock circuit for providing clock signals to the secondary memory access device and alternatively providing clock signals to the plurality of non-volatile memory registers.

5. The mailing machine according to claim 3, wherein:

the state machine erases includes a write disable circuit for disabling write access to the plurality of postal security data registers; and the state machine erases includes a postal security device processor disable circuit for disabling the postal security device processor.

6. The mailing machine according to claim 5, wherein, the write disable circuit is driven when the emergency power is present.

7. The mailing machine according to claim 3, wherein:

the state machine serially outputs the data stored in the plurality of postal security data registers after the emergency power is detected.

8. The mailing machine according to claim 1, wherein:

the a primary single integrated circuit includes a first JTAG subsystem; and the secondary memory access device comprises a second JTAG subsystem.

9. A postal security device for processing requests for evidence of postage payment comprising a primary single integrated circuit including:

a postal security device processor used to process the requests for evidence of postage payment;

a plurality of non-volatile memory registers operatively connected to the postal security device processor for storing postal funds record data; and a primary bus and control circuit operatively connecting the postal security device processor to the non-volatile memory registers for read and write access;

a secondary memory access device operatively connected to the non-volatile memory registers to provide read only access to the plurality of non-volatile memory registers, wherein, the secondary memory access device erases a secure memory location before providing read only access to the plurality of non-volatile memory registers.

10. The postal security device according to claim 9, wherein, the secondary memory access device comprises a state machine and bus multiplexor and a write disable circuit.

11. The postal security device according to claim 9, further comprising:

a first power circuit for powering the postal security device processor, the plurality of non-volatile memory registers, and the primary bus and control circuit;

a second power circuit for providing emergency power and powering the secondary memory access device and alternatively powering the plurality of non-volatile memory registers.

12. The postal security device according to claim 10, further comprising:

a first clock circuit for providing clock signals to the postal security device processor, the plurality of non-volatile memory registers, and the primary bus and control circuit;

a second clock circuit for providing clock signals to the secondary memory access device and alternatively providing clock signals to the plurality of non-volatile memory registers.

13. The postal security device according to claim 11, wherein:

the state machine erases includes a write disable circuit for disabling write access to the plurality of postal security data registers; and the state machine erases includes a postal security device processor disable circuit for disabling the postal security device processor.

14. The postal security device according to claim 13, wherein, the write disable circuit is driven when the emergency power is present.

15. The postal security device according to claim 11, wherein:

the state machine serially outputs the data stored in the plurality of postal security data registers after the emergency power is detected.

16. The postal security device according to claim 9, wherein:

the a primary single integrated circuit includes a first JTAG subsystem; and the secondary memory access device comprises a second JTAG subsystem.

* * * * *